March 13, 1962 T. E. McDUFFIE 3,025,038
TEMPERATURE SWEEP DEVICE
Filed May 29, 1959 2 Sheets-Sheet 1

INVENTOR.
THOMAS E. McDUFFIE
BY
Max A. Farmer
ATTORNEYS

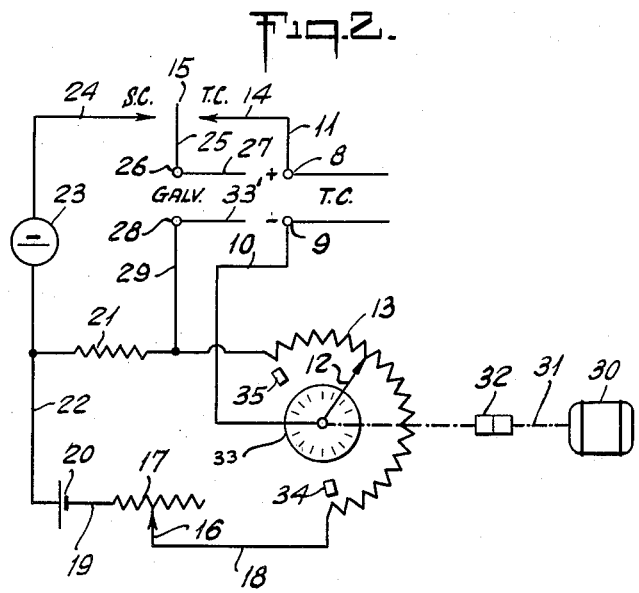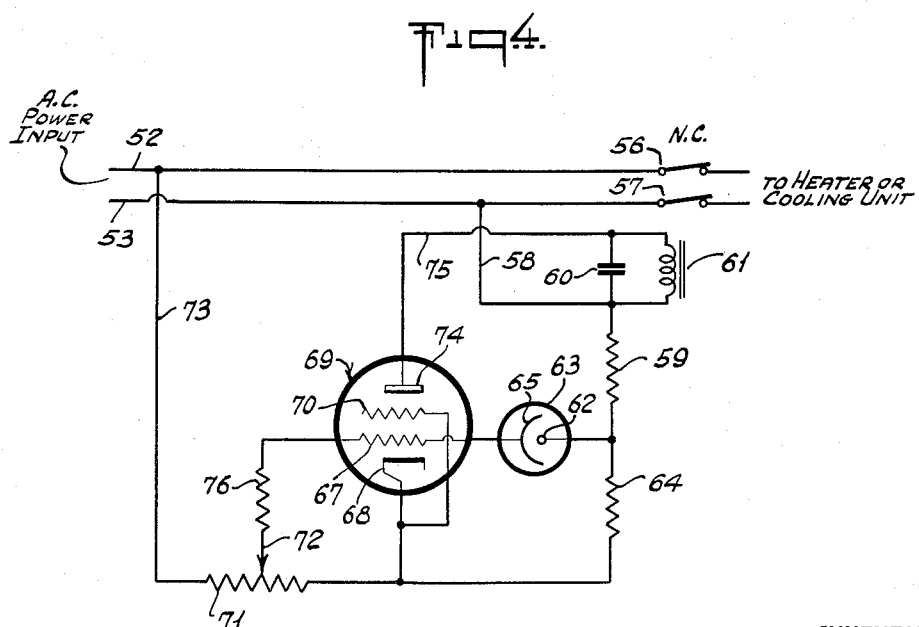

United States Patent Office

3,025,038
Patented Mar. 13, 1962

3,025,038
TEMPERATURE SWEEP DEVICE
Thomas E. McDuffie, 109–16 Hannibal St., Hollis 12, Long Island, N.Y.
Filed May 29, 1959, Ser. No. 817,001
4 Claims. (Cl. 257—274)
(Granted under Title 35, U.S. Code (1952), sec. 266)

The invention described herein may be manufactured and used by or for the Government of the United States of America for government purposes without the payment of any royalties thereon or therefor.

This invention relates in general to the functional evaluation of piezoelectric elements or other components or equipment which are operationally sensitive to temperature variation, and more particularly to a method of and means for automatically continuously varying the internal temperature of an insulated chamber containing the elements or components to be evaluated.

It is well known that oscillators, controlled by piezoelectric elements, will oscillate at frequencies determined by the circuit and the element parameters, but this frequency of oscillation will however, also vary as a function of the ambient temperature of the piezoelectric element. In order to evaluate the operational characteristics of the piezoelectric elements as a function of frequency and temperature it is necessary to vary the ambient temperature at which the element operates. More particularly, it is desirable to observe the frequency variation or deviation of the element while it is subjected to a continuously varying ambient temperature. The rate of change of the ambient temperature must be both automatic accurate and predetermined in order that the evaluation of the elements be correct.

Manual control of the ambient temperature and its constant variation are both laborious and time consuming making it necessary to develop methods for automatically accomplishing this temperature cycling. Previous systems for controlling the temperature cycling of chambers such as those used with crystal ovens have many inherent drawbacks, and so require redesign and simplification in order that they be both accurate and simple in operation.

An object of this invention is to provide an automatic temperature cycling control system.

A further object of the present invention is to provide an automatic temperature cycling control system wherein the rate of temperature change and the maximum temperature differential may be varied in any predetermined manner.

Other objects are to provide an electrically and mechanically simple, efficient, inexpensive and accurate system for providing automatic temperature cycling.

Other objects and advantages will be apparent from the following description of an embodiment of the invention, and the novel features thereof will be particularly pointed out hereinafter in connection with the appended claims.

FIG. 3 is a diagram of the galvanometer circuit, and FIG. 4 is a schematic illustration of the switching control unit of the embodiment of the invention.

Figure 1:
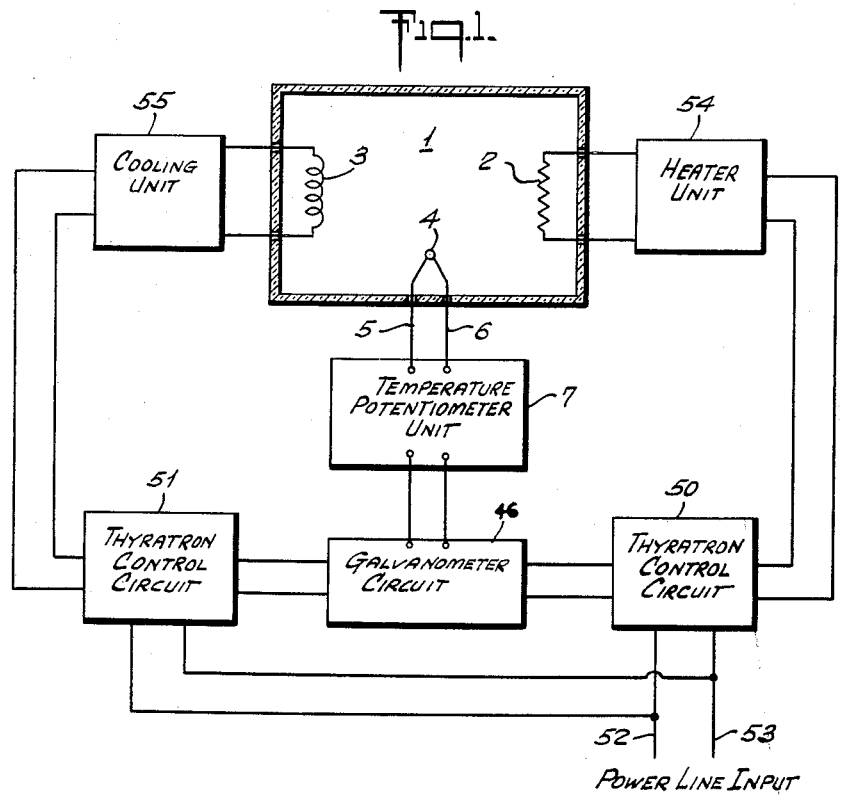
FIG. 1 is a schematic block diagram of one embodiment of the invention.
Figure 2:
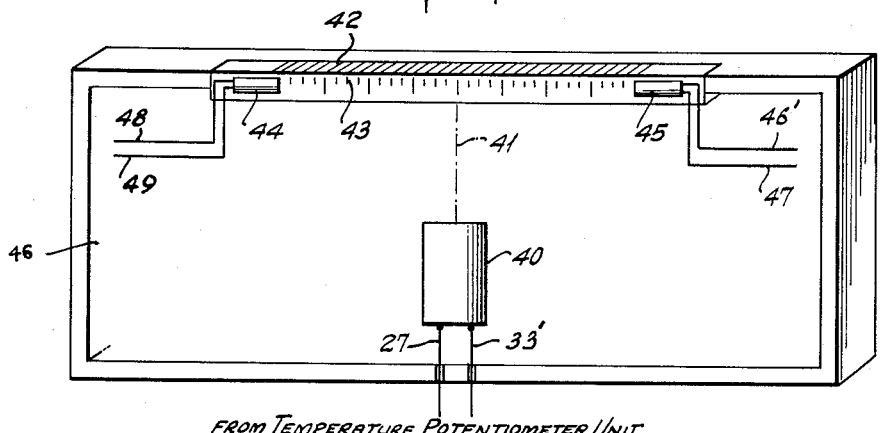
FIG. 2 is a schematic diagram of a temperature potentiometer unit for use with the illustrated embodiment of the invention.

The embodiment of this invention illustrated in FIG. 1 comprises an insulated chamber 1 having suitably supported therein a heater element 2 for increasing the internal temperature of the chamber, refrigerating coils 3 for cooling the interior of the chamber and a thermoelectric junction or thermocouple 4 or any suitable sensitory device for converting or relating the internal chamber temperature to an electrical voltage. Electrical conductors 5 and 6 connect the thermocouple to a temperature potentiometer unit 7. For the sake of clarity and simplicity, a relatively simple form of temperature potentiometer has been illustrated though more complex and more accurate units may be substituted. In FIG. 2 the internal configuration and elements of the temperature potentiometer unit are illustrated in greater detail, wherein the input terminal posts 8 and 9, to which the wire conductors from the thermocouple are attached, are connected to conductors 10 and 11. One of such conductor, such as 10 has its opposite end electrically connected to the movable sliding contact 12 of the arcuate potentiometer 13 mounted within the temperature unit, and the other conductor connected to one of two fixed terminals 14 of switch 15. One free end of the potentiometer is connected to the movable arm 16 of rheostat 17 by conductor 18. Conductor 19 connects an end of the rheostat to the negative terminal of a battery service cell 20 and the opposite or positive terminal of the cell is connected to a fixed resistor 21 by conductor 22. From this connection conductor 22 terminates at the positive terminal end of a standard battery cell 23 and conductor 24 connects the negative terminal of the standard cell to the other of the two fixed contacts of switch 15. The movable contact 25 of switch 15 is connected to terminal post 26 which in turn is connected by wire 27 to a galvanometer 40 of FIG. 3. The adjacent terminal post 28 is connected to the other terminal of the galvanometer and by wire 29 to the junction of fixed resistor 21 and the other free end of potentiometer thus completing the circuit. A variable speed motor 30 preferably having a reversing switch (not shown) is coupled through shaft 31 to the shaft of the movable arm 12 of the potentiometer through a coupling clutch 32 which permits manual rotation of arm 12 by decoupling the motor. The temperature potentiometer as is common in practice, is provided with a scale readout 33 which is also coupled to the shaft of the sliding contact arm 12 and indicates (by proper scaling) in degrees the temperature of the thermocouple 4 (chamber temperature). Two switch stops 34 and 35 mounted on the potentiometer for bodily movement along the periphery of the potentiometer are connected electrically to the motor to reverse the motor rotation direction when the sliding contact has reached a predetermined position (setting of the stop). The basic operation of the temperature potentiometer of this device may best be explained first by reference to the manual operation of the device. Referring now to FIG. 2, the current from the service cell 20, which may be either a dry cell or a storage cell, passes through the main circuit composed of a fixed series resistor 21, a circular potentiometer 13 and a variable rheostat 17. The relative values of these resistive elements and the magnitude of the current passing through them determine the range of the instrument. This range should correspond to the range of the thermocouple employed and to the range of chamber temperatures to be cycled. By means of switch 15 either the standard cell 23 or the thermocouple 4 can be connected to the main circuit. The standard cell voltage is balanced, through galvanometer 40 connected to terminal posts 26 and 28, against an equal voltage drop developed in the common portion (across resistor 21) of the main circuit by the service cell current. The potential drop across this resistor due to the service cell is made to correspond to this definite (voltage of standard cell) voltage by varying the rheostat 17 in the main circuit. The E.M.F. of the thermocouple can be compared and determined by closing the T.C. switch 15 and manually moving the sliding contact 12 of the temperature potentiometer until the galvanometer 40 indicates a balance. The potential drop across the common portion of the main circuit (sliding contact 12 and the junction of resistor 21 with the potentiometer) is then equal to the thermocouple E.M.F. and may be read on some suitable device such as a high impedance vacuum tube voltmeter, or the angular rotation of the slide contact 12 may be calibrated directly in temperature (depending on the particular thermocouple employed) since the angular rotation of the potentiometer is a function of the thermocouple E.M.F. and the thermocouple E.M.F. is a function of the thermocouple temperature.

If now the sliding contact 12 is slowly rotated by a variable speed motor 30 mechanically connected to the shaft of the sliding contact of the temperature potentiometer through a coupling unit 32 by shaft 31, then a continual unbalance or current will flow through the galvanometer circuit as the sliding contact is rotated since only one position of this contact will balance the galvanometer for a particular chamber temperature.

Leads 27 and 33' connect the temperature potentiometer unit to any well-known standard light reflecting galvanometer 40 such as is illustrated in FIG. 3, whose light beam axis 41 is disposed in the coplanar, normal to and directed substantially at the center of a bar-like ground glass surface 42. The face of the ground glass bar opposite the galvanometer has etched thereon a calibrated linear scale 43 mounted adjacent the glass face nearest the galvanometer for bodily movement therealong and disposed on either side of a line directed from the galvanometer to the approximate center of the ground glass surface are two photoelectric cells 44 and 45. The light sensitive portions of the cells are directed approximately perpendicular to the inner surface of the ground glass. The photoelectric cells may be of any suitable variety as for instance, a CE25, provided the sensitivity is sufficient to detect the light entering the photocell after being partially reflected from the ground glass surface. The entire galvanometer circuit including the photoelectric cells 44 and 45 is contained within a light tight container 46 of suitable design except that the outer surface of the ground glass is visible from the exterior of the container in order that the system may be calibrated and the galvanometer deflection observed.

Wires 46', 47 and 48, 49 connect the individual photoelectric cells 44 and 45 within the galvanometer circuit to identical thyratron control circuits 50 and 51. The control circuit is best explained by illustrating the photocell in conjunction with the control circuitry as illustrated in FIG. 4, though the photocells are mounted in the galvanometer container 46 and external to the control circuit. Conductor lines 52 and 53 supply A.C. power to the individual control circuits and also individually energize the heating and cooling devices 54 and 55 through these control circuits. The input voltage appears both at the relay contacts 56 and 57 through wires 52 and 53 and one side of the line is connected by conductor 58 to the junction of a fixed resistor 59, a fixed capacitor 60 and one end of the relay coil 61. The opposite end of resistor 59 is connected to both the anode 62 of the photoelectric cell 63 and one end of fixed resistor 64. The cathode 65 of the photocell is electrically joined to the grid 67 of the thyratron tube 68 such as a 2D21, and the opposite end of resistor 64 is connected to the cathode 68 of the thyratron tube 69 which in turn is shorted to a grid 70 of the tube, and one fixed terminal of potentiometer 71. The sliding contact 72 of the potentiometer is connected to the control grid 67 of the tube while the other fixed terminal of the potentiometer is connected to the input power line 52 by wire conductor 73. The other end of the capacitor 60 and relay coil 61 are joined together and connected to the plate 74 of the tube by conductor 75, while the other relay contacts are connected to supply power to either the heating or cooling units except when the relay 61 is activated and the contacts 56 and 57 normally closed, are open circuited and the unit being controlled is thereby deactivated.

Initially the reflecting galvanometer 40 is undeflected (directed toward the center of the ground glass) and neither photocell receives sufficient light to activate it so that the input A.C. voltage preferably about 115 volts is impressed across the series combination of the fixed resistors 59 and 64 and the fixed terminals of potentiometer 1. Since the photocell is not activated, the grid 67 voltage is below the cathode 68 voltage by an amount dependent on the position of the sliding contact 72 of the potentiometer 71. This grid bias voltage is equal to the voltage drop across the potentiometer from the end connected to the tube cathode 68 to the sliding contact 72 and it is adjusted sufficiently negative by rotation of sliding contact 72 to prevent the tube from conducting with 115 v. A.C. at the tube plate 74 with the photocell inactivated. Grid resistor 76 is of a sufficiently high resistance to prevent any appreciable grid current when the tube conducts and the resistance of the series combination of resistors 59 and 64 and potentiometer 71 is also high enough to prevent appreciable A.C. current from being drawn through it. If the galvanometer 40 deflects toward one of the photocells causing sufficient light to impinge on the cell, then as is well known, the effective resistance across the photoelectric cell (cathode-anode) decreases and a voltage approximating that existing at the junction of resistors 59 and 64 due to the A.C. power input is impressed on the grid 67 of the tube across resistor 76 so that the grid to cathode bias is increased in a positive direction and the net grid to cathode bias voltage exceeds the critical voltage of the thyratron tube for some value on the A.C. plate voltage cycle and the tube conducts from cathode to plate. The thyratron now acts as a rectifier and the D.C. thyratron tube current passes through the coil of the D.C. relay 61 and activates the contacts 56 and 57 of the relay. Chattering of the contacts, normal with A.C. voltages, is eliminated by the smoothing effect of the charging and discharging of capacitor 60. The contacts are normally closed (unit being controlled is operating) except when the tube conducts and then the contacts are opened by the current passing through the relay. It should be noted that the D.C. relay resistance is of a value such that plate current drawn during conduction does not exceed the capabilities or limitations of the thyratron tube used.

The operating procedure of the temperature cycling device of this invention will best serve to illustrate the overall functioning of the system from the initial adjustments to the final automatic temperature cycling of the chamber. Initially, the motor 30 which rotates the sliding contact of the temperature potentiometer 13 is disengaged by means of the clutch coupling 32 and after adjustment of the service cell current within the temperature potentiometer unit, the sliding contact 12 of potentiometer 13 is manually adjusted while switch 15 is in the T.C. position until the galvanometer 40 indicates a balance (undeflected) by observing the light impinging on the ground glass 42 of the galvanometer circuit. When the light beam is thereby centered on the ground glass, the galvanometer is in balance, indicating that the temperature reading on the potentiometer scale 33 is the temperature within the chamber. The sensitivity of the individual control units 50 and 51 is now to be adjusted. The procedure for both control units is identical. The galvanometer light is deflected as desired slightly off center and the thyratron bias is adjusted (by potentiometer 71) for that control unit upon which the reflected light from the galvanometer impinges until the tube just fires (conducts) and de-energizes the particular section (heating or cooling) controlled by it. The sensitivity is thereby made a function of the galvanometer deflection. Sensitivities of the order of ±1° C. are readily attainable.

The process is repeated for the other control unit and the stops 34 and 35 on the potentiometer are set to reverse the rotation of the motor 30 when the sliding contact rotates to the position of the stops so that the system will cycle (back and forth) between any two preset temperatures. The motor speed is then adjusted by any suitable means such as pulleys, gears or a D.C. motor whose speed may be electrically varied is employed to rotate the temperature potentiometer. Since the motor rotates the temperature potentiometer 13, and the rotation thereby results in a constant unbalance on the galvanometer, one or the other of the control units will be operating to control the temperature of the chamber in accordance with the rotation of the potentiometer by deactivating either the heating or cooling device. If we consider that the temperature potentiometer 13 is rotated in a direction to create an unbalance so as to deactivate the cooling unit 55 then the temperature of the chamber will increase since the heating unit 54 is still operating. If the temperature of the chamber increases too rapidly, then the voltage from the temperature potentiometer unit will be of a polarity opposite to that inducing the temperature rise, and it will deflect the galvanometer to the opposite side of the ground glass and de-energize the heating unit while again permitting the cooling unit to operate since the relay contacts are normally closed when no light strikes the photocell. When the position of galvanometer balance is passed through the heater unit will be reactivated. An analogous situation exists if the temperature potentiometer were rotated for decreasing temperatures. It can therefore be seen that the chamber temperature will be automatically adjusted in accordance with the temperature potentiometer rotation. When the stops 34 or 35 are encountered by the sliding contact 12 the motor rotation is reversed and the cycle repeated in an opposite direction. Manual operation of the cycling may be accomplished merely by disengaging the motor from the potentiometer by the coupling clutch and turning the temperature potentiometer slowly by hand. For automatic operation the speed of the motor determines the period of the cycling while the stops determine the temperatures between which the cycling takes place.

It will be understood that various other changes in the details, materials and the arrangement of parts which have been herein disclosed in order to explain the nature of this invention, may be made by those skilled in the art within the principle and scope of the invention as expressed in the appended claims.

I claim:

1. In a device for progressively varying a condition over a selected time that combination which comprises means for modifying said condition, means responsive to said condition for creating a D.C. voltage proportional to said condition, a different source of D.C. voltage, a closed circuit including in series therein said different source of voltage and a resistance, another circuit including therein a light reflecting type galvanometer, said means responsive to said condition and a variable portion of said resistance of said closed circuit, a pair of spaced apart light sensitive elements disposed to receive and respond to the light reflected by said galvanometer, each of said elements positioned to intercept said reflected light at a different selected deflection of said light galvanometer, said elements controlling said means for modifying said condition dependent on which of said elements is receiving more light from said galvanometer, the polarities of said source of D.C. voltage and said proportional D.C. voltage tending to cause currents to flow in the same direction in said variable portion of said resistance, whereby the activity of said galvanometer in modifying said condition will depend upon the variation in said variable portion of said resistance.

2. The device according to claim 1, wherein said elements are photo-electric cells and are disposed on opposite sides of the light beam emanating from the galvanometer in its undeflected position.

3. The device according to claim 2, wherein said means for modifying said condition includes a pair of thyratron circuits, one electrically connected to each of said photo-cells and each responsive to the voltage output of the respective cell to which it is connected.

4. A device for progressively varying the temperature of a chamber over selected time and temperature ranges, which comprises said chamber, heating and cooling means for modifying the temperature of said chamber, means responsive to the temperature of said chamber, for creating a D.C. voltage proportional to said chamber temperature, a different source of D.C. voltage, a closed circuit including in series therein said different source of voltage and a potentiometer connected in full resistance and having a movable tap, a rheostat, another circuit including therein a light reflecting type galvanometer, said means responsive to said chamber temperature and said movable tap, means coupled to said movable tap for progressive bodily movement of said tap, a pair of photo-electric cells positioned to receive the light beam emanating from said galvanometer, each of said cells disposed on opposite sides of the light beam when said galvanometer is in its undeflected condition, a pair of thyratron control circuits, one of said thyratron circuits electrically connected to receive the output of one of said cells, said one control circuit having its output arranged to activate and continue active the heating means upon continued receipt of an output signal from said one cell, the other of said thyratron circuits electrically connected to receive the output signal from the other of said cells, said other control circuit having its output arranged to activate and continue active the cooling means upon continued receipt of an output from said other cell, the polarities of said source of D.C. voltage and said proportional D.C. voltage tending to cause currents to flow in the same direction in the variable portion of said potentiometer whereby the temperature of said chamber will be modified in accordance with the position of said tap.

References Cited in the file of this patent

UNITED STATES PATENTS

| | | |
|---|---|---|
| 2,100,460 | Specht | Nov. 30, 1937 |
| 2,216,301 | Sparrow | Oct. 1, 1940 |
| 2,424,305 | Davis | July 22, 1947 |
| 2,954,479 | Cibelius | Sept. 27, 1960 |